Figure 1:
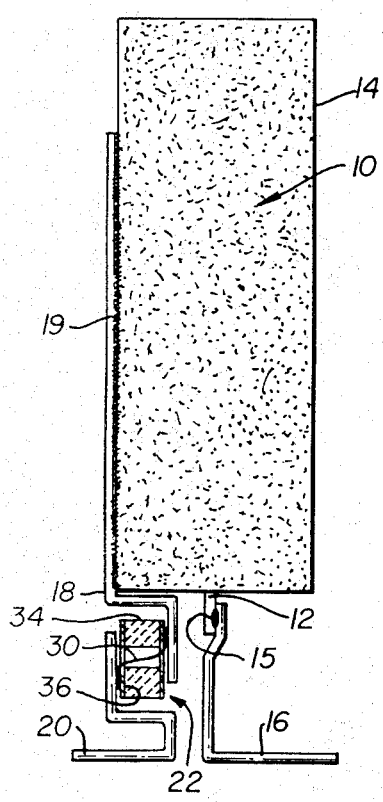

United States Patent [19]

DeMatos et al.

[11] 4,224,656

[45] Sep. 23, 1980

[54] FUSED ELECTROLYTIC CAPACITOR ASSEMBLY

[75] Inventors: Henrique V. DeMatos; John Piper, both of Greenville, S.C.

[73] Assignee: Union Carbide Corporation, New York, N.Y.

[21] Appl. No.: 966,392

[22] Filed: Dec. 4, 1978

[51] Int. Cl.² .................. H01G 9/00; B01J 17/00
[52] U.S. Cl. ......................... 361/433; 361/274; 29/570
[58] Field of Search .............. 361/433, 274, 275; 29/570

[56] References Cited

U.S. PATENT DOCUMENTS

| | | | |
|---|---|---|---|
| 3,553,542 | 1/1971 | Netherwood | 361/433 |
| 3,612,957 | 10/1971 | Steigerwald | 361/433 |
| 4,006,443 | 2/1977 | Kouchich et al. | 338/215 |
| 4,016,464 | 4/1977 | Voyles et al. | 361/433 |
| 4,107,758 | 8/1978 | Shirn et al. | 361/275 |
| 4,107,759 | 8/1978 | Shirn et al. | 361/275 |
| 4,121,277 | 10/1978 | Hilbert | 361/433 |

FOREIGN PATENT DOCUMENTS

| | | | |
|---|---|---|---|
| 752985 | 2/1967 | Canada | 361/433 |
| 416018 | 9/1934 | United Kingdom | 361/433 |

*Primary Examiner*—Andrew J. James
*Attorney, Agent, or Firm*—Frederick J. McCarthy, Jr.

[57] ABSTRACT

Fusing assembly for electrolytic capacitors including a fuse element thermally isolated from the capacitor.

4 Claims, 5 Drawing Figures

FUSED ELECTROLYTIC CAPACITOR ASSEMBLY

The present invention is directed to solid electrolytic capacitors. More particularly the present invention is directed to a solid electrolytic capacitor assembly including a fuse formed of exothermically alloyable metals.

Solid electrolytic capacitors are well known and widely used in circuit applications. In many such applications in the event of a failure due to excessive current flow it is important to provide fusing so that current flow is interrupted and damage to circuit components is avoided. In particular, an important reason for wanting to fuse solid tantalum capacitors is that they are often used directly across a power supply with a very large amount of current available to them. If the capacitors fail due to short circuit, the most common failure mode, then enough heat can often be generated to ignite the tantalum metal which burns with a highly exothermic reaction somewhat similar to burning magnesium. It is known to incorporate fusing arrangements in the housing of solid electrolytic capacitors, using the heat generated in the capacitor body, under "overload" conditions, to initiate an exothermic alloying and interruption of a thermally coupled fuse element (see U.S. Pat. No. 4,107,762—1978). Such an arrangement being dependent on thermal coupling between a fuse element and a capacitor body, which can have a variety of sizes and shapes, unless particularly designed does not always have a constant relationship to current flow. Further, with such an arrangement, a large segment of the capacitor has to be heated up to the temperature at which the alloying of the exothermic metals of the fuse occurs. That is to say, the circuit power supply has to provide enough energy to heat up the tantalum anode, perhaps 100° or 200° C. If the anode has a typical mass of about 0.3 grams and the temperature increase required for fusing is 200° C., then the relatively large amount of about 9 joules of energy are required for the fusing.

It is therefore an object of the present invention to provide an exothermic fusing assembly for solid electrolytic capacitors which can be directly related to a relatively small current flow and which requires a relatively small amount of energy for fusing.

Figure 2A:
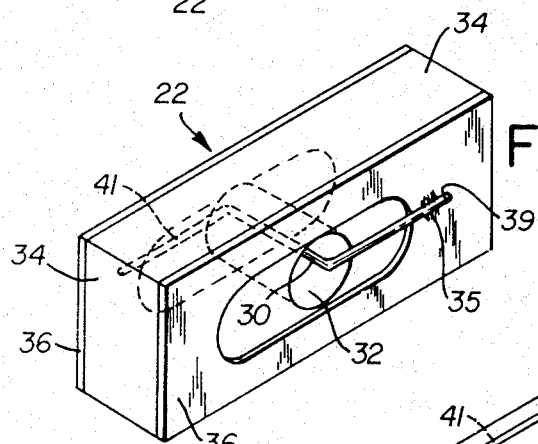
Figure 2B:
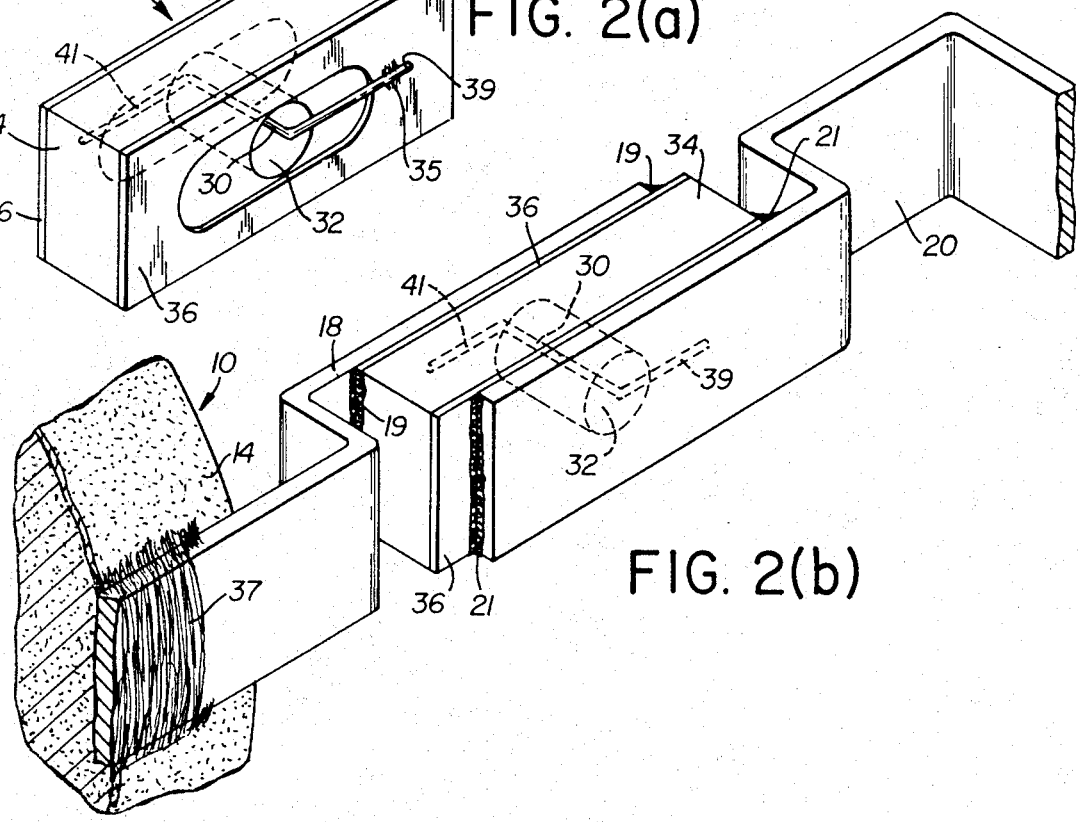

Other objects will be apparent from the following description and claims taken in conjunction with the drawing wherein FIG. 1 shows a solid electrolytic capacitor body having the fusing arrangement of the present invention connected thereto FIGS. 2(a) and 2(b) show respectively the fusing arrangement of the present invention prior and subsequent to connection to an electrolytic capacitor body.

Figure 3:
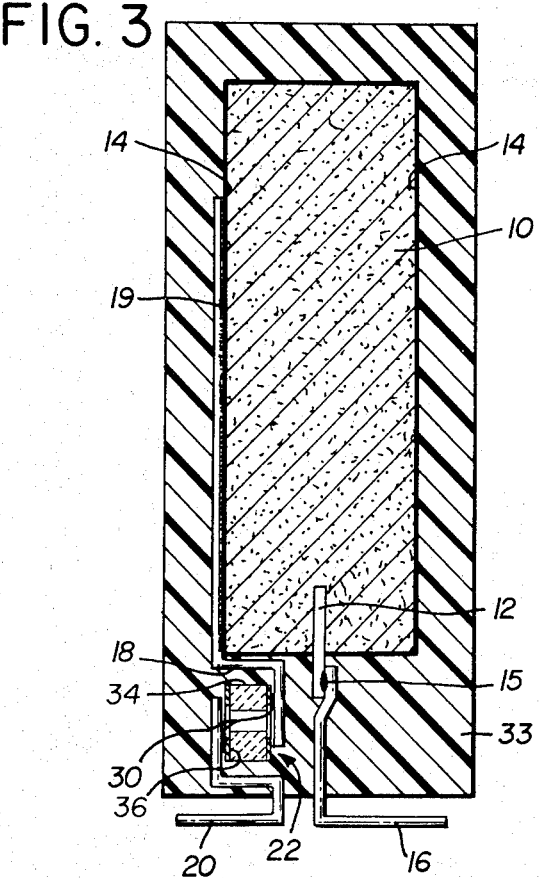
Figure 4:
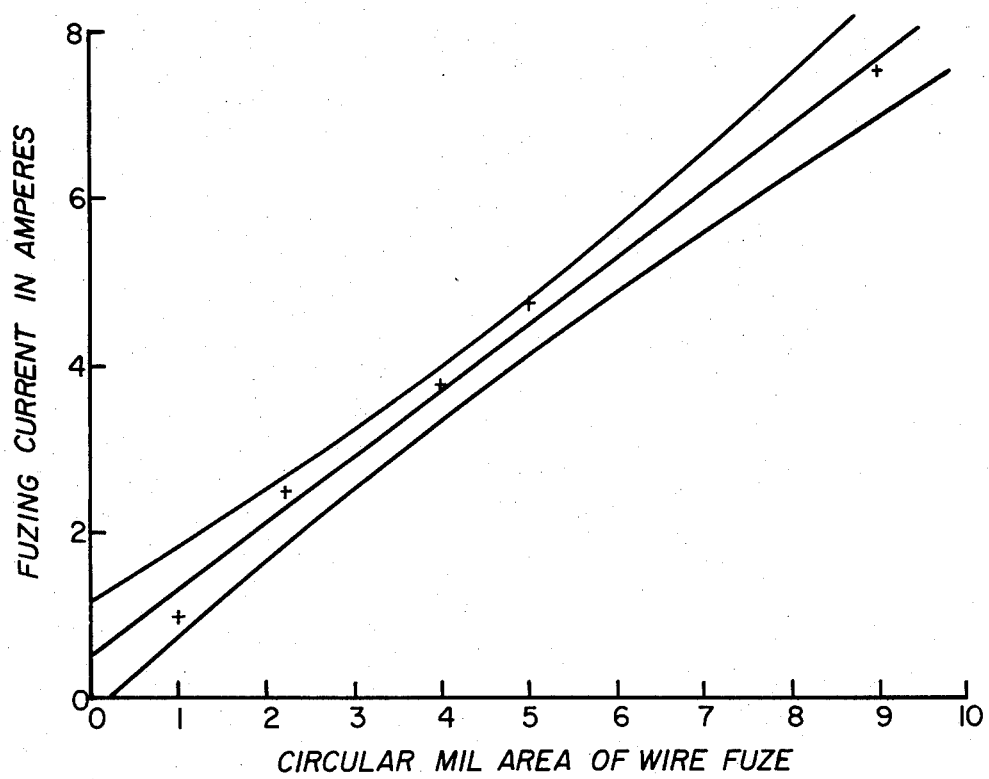

FIG. 3 shows a fused electrolytic capacitor assembly in accordance with the present invention and FIG. 4 shows a graph of fusing current conditions applicable to embodiments of the present invention.

The fused electrolytic capacitor assembly of the present invention will be more clearly understood with reference to the drawing wherein FIG. 1 shows at 10 a conventional solid electrolytic capacitor body, e.g., formed of tantalum having a positive terminal in the form of anode riser wire 12 and a negative terminal in the form of a metal coating, e.g., silver solder cathode coating 14. An anode lead 16, e.g., in the form of metal strip is welded at 15 to anode riser 12. Leads 18 and 20, e.g., also suitably in the form of metal strip, are joined to fuse subassembly 22 containing fuse element 30, as hereinafter more particularly described, and lead 18 is soldered at 19 to the cathode coating 14 of capacitor body 10, e.g., by conventional dip soldering technique, thereby placing fuse subassembly 22 in electrical series with capacitor body and terminal lead 20.

With reference to FIG. 2(a), the fuse subassembly 22 comprises a fuse element 30, e.g., in wire form, formed of two metallic elements, in intimate contact with each other, which, when brought to an initiating temperature, alloy rapidly and exothermically resulting in instantaneous deflagration and disruption of the fuse and interruption of current flow. Such wires are commercially available and are described in the PYROFUSE* bulletin of Pyrofuse Corporation. The fuse element 30, with reference to FIG. 2(a), is received in cavity 32 of body 34 which is formed of a thermally insulative material, e.g., glass filled epoxy. The cavity 32 receiving fuse element 30 is larger than fuse element 30 and the active portion of fuse element 30 is spaced from body 34 and is out of contact therewith and thermally shielded therefrom. That is to say, the temperature of fuse element 30 is essentially determined by the heat energy developed therein by the passage of electrical current therethrough, the fuse element 30 being shielded from surrounding solid portions of the capacitor assembly by an intervening space which contains static air. Initially fuse 30 can be held in such position by a "tack" 35 at fuse element contact portions 39, 41 to the metal, e.g., copper, laminate 36 on heat insulative body 34. In the embodiment shown in FIG. 2(a), body 34 is a portion of conventional glass filled epoxy circuit board having copper laminated surfaces. With the fuse 30 in place as illustrated in FIG. 2(a), with reference to FIG. 2(b), lead strip 18 is soldered at 19 to the copper laminate 36 on one side of heat insulative body 34 and lead strip 20 is similarly soldered at 21 to the other side thus fixing the position of fuse 30 in cavity 32 and providing series electrical connection with fuse 30. It is important that filling of cavity 32 is avoided in the course of soldering. Subsequently, lead 18 is electrically connected to cathode coating 14 of capacitor body 10, e.g., by dip soldering as indicated at 37 and the assembly can be thereafter encapsulated, e.g., by molding, dipping or other techniques, with an electrically insulative material 33, e.g., epoxy. In such case the electrically insulating material surrounds fuse subassembly 22, and encloses capacitor body 10, lead 18, anode riser 12 and portions of leads 16 and 20.

*Trademark of Pyrofuse Corporation

As can be seen from FIG. 3, the fuse element 30 is spaced from capacitor body 10 and is separated therefrom by heat insulative body 34 and also, in the embodiment of FIG. 3, by insulating material 33. Further fuse 30 is confined in substantially airtight cavity 32 and is thermally isolated, or insulated from capacitor body 10, body 34 and material 33. Accordingly, electrical current passing through fuse 30 develops heat energy directly proportional to the square of the current value and this heat energy is released into the static air environment of cavity 32 and essentially confined in cavity 32 on account of the heat insulative properties of adjacent body 34. The static air environment of cavity 32 is important because static air is a very good insulator. The energy delivered into the fuse wire thus remains to heat the fuse wire rather than be dissipated in the environment because of the insulating quality of the static air. Consequently, the temperature of fuse 30 is determined essentially only by the instantaneous current flowing therethrough. Thus, the fusing, i.e., disruption of fuse 30 can be based on a desired relatively small fusing current and the physical dimensions of fuse 30, e.g., diameter, when fuse 30 is in wire form. FIG. 4 shows a graph of data, and an analysis of the data, for fusing current vs. fuse wire cross section for palladium-aluminum single strand wire exothermically alloyable wire commercially available from Pyrofuse Corporation, Mount Vernon, N.Y. For the data of FIG. 4, and with reference to FIG. 2, cavity 32 was 0.031 in. long and 0.032 in. in diameter in a 0.125×0.050×0.031 inch section of copper laminated glass filled epoxy circuit board. In the present invention, since a thermally isolated small segment of fuse wire is heated resistively, relatively little energy is required, usually in the order of 100 millijoules to open the fuse. In the present invention the fuse wire and capacitor body are in series, and hence both are to some degree resistive; therefore, both will be heated resistively rather than heat being developed solely in the fuse element. However, the result of the present invention that the thermally isolated relatively small mass fuse element fuses at relatively low energy levels on the order of 100 millijoules compared to those, about 10 joules, required to cause a significant temperature rise in the relatively large mass capacitor body.

As can be seen from FIG. 4, the fusing current is dependent only on wire size.

An important feature of the present invention to achieve the above-noted effects is that the volume of cavity 32 is larger than the volume of fuse 30, e.g., at least about 4 times larger and preferably from about 10 to 50 times larger and it is important that the cavity be free of any other solid materials and be essentially airtight.

What is claimed is:

1. A fused capacitor assembly comprising a solid electrolytic capacitor body having two terminals, a fuse made of two exothermically alloyable metals in intimate contact with each other, a heat insulative body having a cavity therein substantially larger than said fuse for receiving said fuse, means for positioning said fuse in said cavity such that said fuse is thermally isolated from said heat insulative body and for providing a substantially airtight seal for said cavity, a first lead electrically connected from one said capacitor body terminal to said fuse, a second lead connected to said fuse such that said second lead, fuse and first lead are electrically in series with said capacitor body, a third lead connected to said other capacitor body terminal.

2. A fused capacitor assembly in accordance with claim 1 wherein said fuse comprises a segment of wire and the volume of said cavity is from about 4 to 50 times the volume of the wire in said cavity.

3. A fused capacitor assembly in accordance with claim 1 wherein said heat insulative body is spaced from said capacitor body.

4. A fused capacitor assembly in accordance with claim 1 wherein said capacitor body, and said heat insulative body are encapsulated in an electrically insulative epoxy material.

* * * * *